United States Patent
Roadknight et al.

(10) Patent No.: US 7,346,704 B2
(45) Date of Patent: Mar. 18, 2008

(54) LAYERED COMMUNICATIONS NETWORK WITH ADAPTIVELY DISTRIBUTED NODAL POLICIES

(75) Inventors: Christopher M Roadknight, Suffolk (GB); Ian W Marshall, Suffolk (GB)

(73) Assignee: British Telecommunications public limited company, London (GB)

( * ) Notice: Subject to any disclaimer, the term of this patent is extended or adjusted under 35 U.S.C. 154(b) by 753 days.

(21) Appl. No.: 10/380,003

(22) PCT Filed: Sep. 14, 2001

(86) PCT No.: PCT/GB01/04134

§ 371 (c)(1),
(2), (4) Date: Mar. 11, 2003

(87) PCT Pub. No.: WO02/23817

PCT Pub. Date: Mar. 21, 2002

(65) Prior Publication Data

US 2003/0177262 A1    Sep. 18, 2003

(30) Foreign Application Priority Data

Sep. 14, 2000    (GB) .................. 0022561.5

(51) Int. Cl.
*G06F 15/173* (2006.01)
(52) U.S. Cl. ..................... 709/238; 709/240
(58) Field of Classification Search ............... 709/238
See application file for complete search history.

(56) References Cited

U.S. PATENT DOCUMENTS

| | | | |
|---|---|---|---|
| 5,341,477 A | | 8/1994 | Pitkin et al. |
| 5,539,883 A | * | 7/1996 | Allon et al. ............. 718/105 |
| 5,940,622 A | * | 8/1999 | Patel ........................ 717/158 |
| 5,963,447 A | * | 10/1999 | Kohn et al. ................ 700/49 |
| 5,970,064 A | * | 10/1999 | Clark et al. ............... 370/351 |
| 6,226,273 B1 | | 5/2001 | Busuioc et al. |
| 6,272,544 B1 | * | 8/2001 | Mullen ..................... 709/226 |
| 6,310,883 B1 | * | 10/2001 | Mann et al. .............. 370/408 |
| 6,393,474 B1 | | 5/2002 | Eichert et al. |
| 6,449,650 B1 | * | 9/2002 | Westfall et al. ........... 709/228 |
| 6,473,851 B1 | | 10/2002 | Plutowski |

(Continued)

FOREIGN PATENT DOCUMENTS

EP    0384339 A2    8/1990

(Continued)

OTHER PUBLICATIONS

Chen et al, "Threshold-Based Admission Control Policies for Multimedia Servers", Computer Journal, Oxford University Press, Surrey, GB, vol. 39, No. 9, 1996, pp. 757-766, XP000720396.

(Continued)

*Primary Examiner*—William Vaughn
*Assistant Examiner*—Ranodhi Serrao
(74) *Attorney, Agent, or Firm*—Nixon & Vanderhye P.C.

(57) ABSTRACT

An emergent network is autonomous at the service level. Network nodes have policies that enable them to process different types of service requests, with the processing earning the nodes 'rewards'. Successful nodes can pass some or all of their policies to other nodes using the evolutionary biology of bacteria as a model.

9 Claims, 7 Drawing Sheets

U.S. PATENT DOCUMENTS

| | | |
|---|---|---|
| 6,477,150 B1 | 11/2002 | Maggenti et al. |
| 6,490,255 B1 | 12/2002 | Kiriha et al. |
| 6,628,610 B1 | 9/2003 | Waclawsky et al. |
| 6,701,342 B1 | 3/2004 | Bartz et al. |
| 6,728,748 B1 * | 4/2004 | Mangipudi et al. ......... 718/105 |
| 6,952,401 B1 * | 10/2005 | Kadambi et al. ............ 370/232 |
| 6,985,442 B1 * | 1/2006 | Wang et al. ................. 370/232 |
| 2002/0010798 A1 * | 1/2002 | Ben-Shaul et al. ......... 709/247 |
| 2003/0014538 A1 | 1/2003 | Roadknight et al. |
| 2003/0177262 A1 | 9/2003 | Roadknight et al. |
| 2004/0071147 A1 | 4/2004 | Roadknight et al. |

FOREIGN PATENT DOCUMENTS

| | | |
|---|---|---|
| EP | 0889656 A3 | 11/2000 |
| EP | 1221786 A1 | 7/2002 |
| WO | WO 99/30460 | 6/1999 |
| WO | WO 00/33204 | 8/2000 |
| WO | WO 01/59991 A2 | 8/2001 |
| WO | WO 02/23817 A1 | 3/2002 |
| WO | WO 03/017592 A1 | 2/2003 |
| WO | WO 03/034664 A1 | 4/2003 |

OTHER PUBLICATIONS

Goldszmidt, "Load Management for Scaling Up Internet Services", NOMS '98, 1998 IEEENetwork Operations and Management Symposium, New Orleans, LA, Feb. 15-20, 1998, IEEE Network Operations and Management Symposium, New York, NY: IEEE, US, vol. 3, Conf. 10, Feb. 15, 1998, pp. 828-835, XP000793430.

Colajanni et al, "Adaptive TTL Schemes For Load Balancing of Distributed WEB Servers", Performance Evaluation Review, Association for Computing Machinery, New York, NY, US, vol. 25, No. 2, Sep. 1, 1997, pp. 36-42, XP000199853.

Shimamoto et al, "A Dynamic Routing Control Based on a Genetic Algorithm", Proceedings of the International Conference on Neural Networks (ICNN), San Francisco, Mar. 28-Apr. 1, 1993, New York, IEEE, US, vol. 1, Mar. 28, 1993, pp. 1123-1128, XP010111747.

U.S. Appl. No. 11/629,204, filed Dec. 2006, Roadknight.

International Search Report and Written Opinion dated Dec. 23, 2005.

International Searching Authority (Communication Relating to the Results of the Partial International Search dated Jun. 10, 2005.

UK Search Report dated Mar. 1, 2005.

UK Search Report dated Nov. 22, 2004.

Marshall et al., "Management of Future Data Networks", IEEE 2001, pp. 1143-1148.

Roadknight et al., "Future Network Management—A Bacterium Inspired Solution", circa 1997.

Boulis et al., Aggregation in Sensor Networks: An Energy-Accuracy Trade-Off, pp. 128-138, IEEE 2003.

Carle, "Energy-Efficient Area Monitoring for Sensor Networks", 2004 IEEE, pp. 40-46.

Munaretto et al., "Policy-Based Management of Ad Hoc Enterprise Networks", 2002.

Shen et al., "Adaptive Autonomous Management of Ad Hoc Networks", 2002 IEEE.

McGrath et al., "The Actcomm Project: Mobile Agents and Ad Hoc Routing Meeting Military Requirements for Information Superiority", pp. 413-417, 2001 IEEE.

Marshall et al., "Emergent Quality of Service—A Bacterium Inspired Approach", circa 1999.

Marshall et al., "Evolutionary Approaches to Management of Pervasive Computing", May 19, 2003, http://homepages.feis.herts.ac.uk/~nehaniv/EN/seec/abstracts/marshall.html.

Phanse et al., "Addressing the Requirements of QoS Management for Wireless Ad Hoc Networks", circa 2002.

Roadknight et al., "Management of Future Data Networks: An Approach Based on Bacterial Colony Behavior", circa 2001.

Roadknight et al., "Sensor Networks of Intelligent Devices", circa 2002.

Broch et al., "A Performance Comparison of Multi-Hop Wireless Ad Hoc Network Routing Protocols", MobiCom '98, Oct. 25-30, 1998.

Marshall et al., "Adaptive Management of an Active Service Network", BT Technology Journal, vol. 18, No. 4, Oct. 1, 2000, XP002175974.

Yang et al., "Building an Adaptable, Fault Tolerant, and Highly Manageable Web Server on Clusters of Non-Dedicated Workstations", Parallel Processing, 2000, Proceedings, 2000 International Conference on Aug. 21-24, 2000, pp. 413-420, XP002175975.

IBM Technical Disclosure Bulletin, vol. 37, No. 2B Feb. 1994, pp. 215-217, Statistics Gathering and Analyzing Tool for Open Software Foundation's Distributed Computing Environment.

IBM Technical Disclosure Bulletin, vol. 38, No. 07 Jul. 1995, pp. 511-515, Dynamic Load Sharing for Distributed Computing Environment.

International Search Report dated Oct. 31, 2001.

* cited by examiner

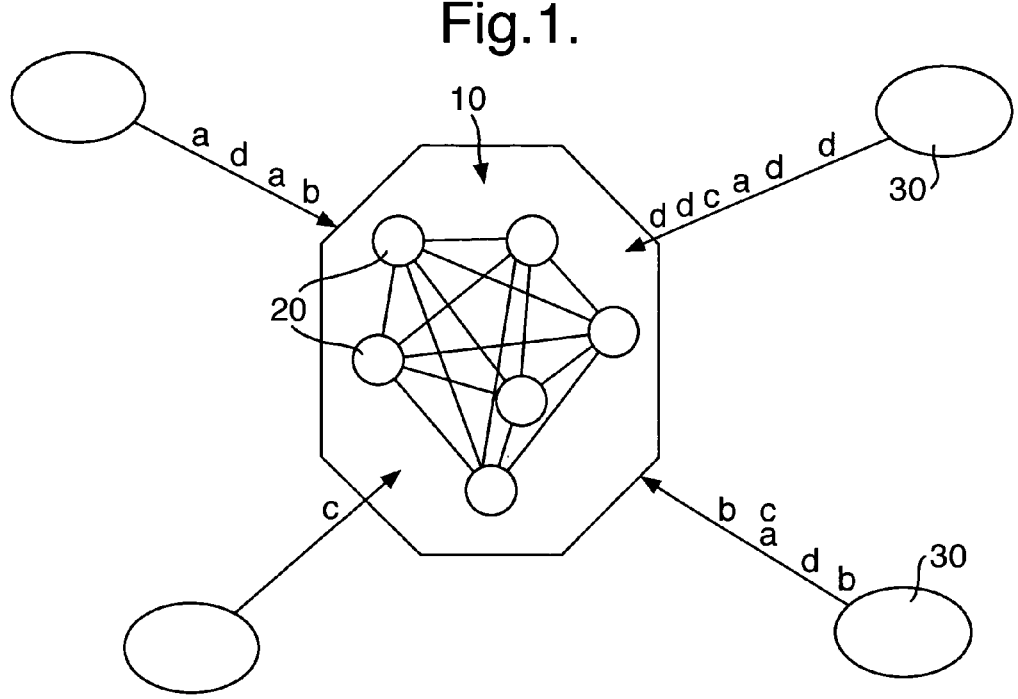

LAYERED COMMUNICATIONS NETWORK WITH ADAPTIVELY DISTRIBUTED NODAL POLICIES

This application is the US national phase of international application PCT/GB01/04134 filed 14 Sep. 2001 which designated the U.S.

BACKGROUND

1. Technical Field

This invention relates to the field of network management and in particular the management of complex data communication networks.

2. Related Art

Communication networks such as the Internet are probably the most complex machines built by mankind. The number of possible failure states in a major network is so large that even counting them is infeasible. Deciding the state that the network is in at any time with great accuracy is therefore not possible. In addition, data networks such as the Internet are subjected to a mixture of deterministic and stochastic load (see V Paxson and S Floyd, "*Wide Area Traffic: The Failure of Poisson Modelling*", IEEE/ACM Transactions on Networking 3, (3), pp 226-244, 1995 & S Gribble and E Brewer, "*System Design Issues for Internet Middleware Services: Deductions from a Large Client Trace*", Proceedings of the USENIX Symposium on Internet Technologies and Systems (USITS '97), December 1997). The network's response to this type of traffic is chaotic (see M Abrams et al, "*Caching Proxies: Limitations and Potentials*", Proc. 4th Inter. World-Wide Web Conference, Boston, Mass., December 1995), and thus the variation of network state is highly divergent and accurate predictions of network performance require knowledge of the current network state that is more accurate than can be obtained. Future networks, which will have increased intelligence, will be even more complex and have less tractable management. A network management paradigm is required that can maintain network performance in the face of fractal demands without detailed knowledge of the state of the network, and can meet unanticipated future demands.

Biologically inspired algorithms (for example genetic algorithms and neural networks) have been successfully used in many cases where good solutions are required for difficult (here, the term 'difficult' is used to represent a problem that is computationally infeasible using brute force methods) problems of this type (see CM Roadknight et al, "*Modelling of complex environmental data*", IEEE Transactions on Neural Networks. Vol. 8, No 4. P. 852-862, 1997 & D Goldberg, "*Genetic Algorithms in Search, Optimization and Machine Learning*", Addison-Wesley, 1989). They simulate evolutionary procedures or neural activation pathways in software, these then acting as problem solving tools. They can do this because they take a clean sheet approach to problem solving, they can learn from successes and failures and due to multiple adaptive feedback loops, they are able to find optima in a fractal search space quickly.

BRIEF SUMMARY

According to a first aspect of the present invention there is provided a multi-service communications network having a substantially polygonal topology and comprising more than one node, each node comprising one or more nodal policy and being configured to process one or more services in accordance with said one or more nodal policy, each nodal policy comprising;

(i) a service request identifier, said service request identifier determining the type of service request that may be processed by each respective node; and (ii) one or more service request criteria, said service request criteria determining whether a type of service request defined by said service request identifier will be processed by each respective node, the processing of said one or more services determining an activity indicator of said node such that the node may vary one or more of the nodal policies in accordance with the activity indicator characterised in that service requests are inserted into node locations along at least one edge of the multi-service communications network. The invention is further characterised in that unprocesesed service request has a tendency to migrate away from the edge of the multi-service communications network at which the service request was introduced.

Preferably, each nodal policy comprises: (i) a service request identifier which determines the type of service request that is processed by each respective node; and (ii) one or more service request criteria which determines whether a suitable type of service request is processed by each respective node. The preferential processing of the service request may be determined by a service request function; this service request function may be the time to live or alternatively it may be the value derived from processing the service request.

It is preferred that if the activity indicator reaches a first upper threshold then the node may export one or more of the nodal policies. This provides the advantage that the policies of successful nodes to be exported for possible use by other nodes. Additionally, if the activity indicator reaches a second upper threshold then the node may replicate all of the nodal policies to generate a clone of the node. The second upper threshold may be a value of the activity indicator that is greater than the first upper threshold or it may be maintaining the first upper threshold for a given period of time. The advantage of this is that nodes which continue to be successful over longer periods are replicated, ensuring the survival of the fittest.

It is also preferred that if the activity indicator reaches a first lower threshold then the node may import a further nodal policy. This provides the advantage that the unsuccessful nodes may acquire policies from successful nodes in order to improve the unsuccessful nodes. Additionally, if the activity indicator reaches a second lower threshold then the node may repress an enabled nodal policy and enable a dormant nodal policy. The second lower threshold may be a value of the activity indicator that is lower than the first lower threshold or it may be maintaining the first lower threshold for a given period of time. This provides the advantage that unproductive policies can be discarded in order that other policies may be used. Furthermore, if the activity indicator reaches a second lower threshold and the node has no dormant nodal policies then the node may delete itself. The advantage of this is that nodes which continue to be unsuccessful over longer periods are removed from the network so that the processing of service requests can be concentrated on successful nodes.

Additionally, one or more of the variables within a nodal policy may be randomly varied, allowing the heterogeneity of nodal policies in the network to be advantageously increased. Each node may further comprise a variable that encodes a preference for existing in a defined region of a cluster. This allows nodes, or nodal policies held within a node to adapt themselves to develop a preference for a particular area of the network, for example a node which specialises in processing service requests with a short TTL may adapt to exist close to the edge of the network where the service requests enter the network.

The multi-service communications network may be implemented as described above using a data carrier storage medium comprising computer code means in conjunction with a processor at each of plural nodes in a multi-services communications network.

BRIEF DESCRIPTION OF THE DRAWINGS

The invention will now be described, by way of example only, with reference to the following figures in which;

FIG. 1 shows a schematic depiction of a multi-service communications network according to the present invention;

FIG. 2 shows a schematic depiction of the response of a multi-service communications network to different levels of network traffic;

DETAILED DESCRIPTION OF EXEMPLARY EMBODIMENTS

Figure 3:
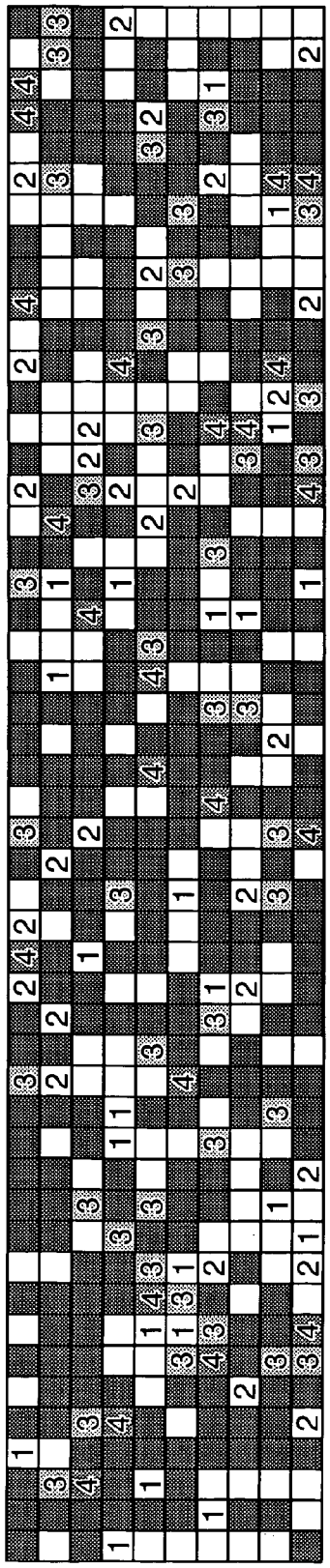
FIG. 3 shows a schematic depiction of the response of a multi-service communications network according to the present invention to different levels of network traffic.

FIG. 1 shows a multi-service communications network 10 that comprises a number of inter-connected nodes 20. These nodes are capable of performing one or more of a number of processes which are needed to support the multi-service network 10, for example an ATM switch, WWW server, IP router, SMTP mail server, domain name server (DNS), etc. The users of the multi-service network 10 are divided into a number of communities 30. These communities are geographically dispersed and have different requirements from the multi-service network, in terms of the type of request and the number of requests made (in FIG. 1, the different types of requests are indicated by the letters a, b, c & d, with each letter representing a request for a different service and the frequency of each letter representing the number of requests made for that service). Over time the number of communities 30 using the network 10 will vary and the nature and volume of network usage of each community will vary in a self-similar, deterministic way (see I Marshall et al, "*Performance implications of WWW traffic statistics*", submitted to http://www.wtc2000.org). Also, the number of services provided by the network will also vary over time as new services are introduced and some services become obsolete and are removed from the network.

One approach to managing such a network would be to make all nodes capable of processing all types of requests and with each node having sufficient capacity to be able to process all of the requests received at that node. However, this would lead to a very inefficient use of resources as virtually every node would be over-dimensioned and have an excess of capacity, both in terms of the type of service requests and the number of service requests that each node would be able to process.

Another approach would be to limit each node to processing a fixed subset of the different services supported by the network and providing a fixed capacity of processing capability for each service type at each node. By placing nodes which can process different types of traffic optimally within the network with respect to the type and number of service requests generated by the nearby communities it will be possible to meet most service requests. There will need to be some management layer within the network so that service requests can be "balanced" across the network, by sending service requests which can not be handled by local nodes to more distant nodes, as the service requests vary across the network. The disadvantage of this approach is that as communities change and the service requirements of the communities change, the location and/or the processing capabilities of the nodes will become less optimal, causing an increase in inter-nodal traffic as service requests are routed to an appropriate node, increasing the management overhead of the network. For a network having N inter-connected nodes there are $N^2$ inter-nodal relationships to manage, which makes such a management scheme intractable as N becomes large (for example, much larger than 1000).

According to the present invention the nodes shown in FIG. 1 are mostly autonomous and their behaviour is driven by a set of policies that finds an analogy in the genetic structure of bacteria. This analogy is consistent with the metabolic diversity and the evolutionary responses of bacteria. The Darwinian mechanism of evolution involves a simple 'survival of the fittest' algorithm (C Darwin, "*The Origin of the Species by Means of Natural Selection*", New American Library, New York). While a Darwinian model is undoubtedly applicable to slowly changing species within a slowly changing environment, the lack of an intra-generational exchange of information mechanism causes problems when applied to environments experiencing very rapid changes.

Bacteria are a set of metabolically diverse, simple, single-cell organisms. Their internal structure is simpler than many other types of living cell, with no membrane-bound nucleus or organelles, and short circular DNA. This is because the genetic structure of bacteria is relatively simple. It has been demonstrated that only around 250 genes are required to code for an independent, self-sustaining bacterium, and highly competent bacteria, for whom the entire genome is known, have only 2000-3000 genes. As a result bacteria can reproduce within 30 minutes of 'birth'. It has been said that bacterial evolution 'transcends Darwinism'(D Caldwell et al, "*Do Bacterial Communities Transcend Darwinism?*", Advances in Microbial Ecology. Vol. 15. p.105-191, 1997), with asexual reproduction ensuring survival of the fittest and a more Lamarkian (Lamark was an 18th century French scientist who argued that evolution occurs because organisms can inherit traits, which have been acquired by their ancestors during their lifetime) mechanism of evolution occurring in parallel, with individuals capable of exchanging elements of their genetic material, known as plasmids, during their lifetime in response to environmental stress, and passing the acquired characteristics to their descendants.

Plasmid migration allows much quicker reaction to sudden changes in influential environmental factors and can be modelled as a learning mechanism. Sustaining fitness in a complex changing fitness landscape has been shown to require evolution together with a fast learning mechanism. It is vital that the learning is continuous, and does not require off-line training as with many neural-net-based approaches. When a population of *E Coli* (a common bacterium) is introduced to a new environment, adaptation begins immediately (see RE Lenski and M Travisano "*Dynamics of Adaptation and Diversification*", Proc. Nat Acad. Sci. 91: 6808-6814, 1994), with significant results apparent in a few days (i.e. O(1000) generations). Despite the rapid adaptation, bacterial communities are also remarkably stable. Fossils of communities (stromatolites) that lived 3.5 billion years ago in Australia appear identical to present day communities living in Shark Bay on Australia's west coast. Bacteria thus have many of the properties (simplicity, resilience, rapid response to change) that are desirable for network entities.

In similar biological systems such as protocists, where the probability of mutation occurring during the copying of a gene is around 1 in a billion, adaptive evolution can occur within 1 m generations (O(1000)yrs). GAs typically evolve much faster since the generation time is O(100) ms and the mutation rate is raised to 1 in a million but adaptation can still only deal with changes on a time-scale of O(10) s. Using bacterial learning (plasmid interchange) in a GA will improve this to O(10) ms, and substantially improve its performance when faced with rapid change.

The set of policies specifies which type of service request the node is able to process (e.g. a, b, c or d from FIG. 1), and a rule, or rules, that determine whether the node will accept a service request or not. Each node has a certain number of policies and these policies determine how the node responds to the changing environment of the network (in the same way as the genetic material of a bacterium determines how that bacterium responds to its environment). The policies take the form {x,y,z} where:

x is a function representing the type of service requested;

y is a function which determines whether a service request is accepted dependent upon the number of service requests queued at the node; and z is a function which determines whether a service request is accepted dependent upon the activity level of the node.

The 'value' that a node may derive from processing a service request would be receiving revenue from a user or network or service provider (this is analogous to a bacterium gaining energy from metabolising resources, such that the bacterium can survive and potentially reproduce). The quantum of revenue will depend upon the type of service request which is processed by the node, with some service requests being more important and hence providing greater reward when they are processed.

Each node may have any number of policies. Enabled nodes (i.e. a node that is processing service requests) will have one or more enabled policies (i.e. policies which are in use to determine the response of the node) and may also have a number of dormant policies (i.e. once enabled policies that are no longer used to determine the response of the node). Dormant policies may be re-enabled and enabled policies may be repressed, becoming dormant.

User requests for service are received by the node(s) nearest the point of entry to the network from the user community generating the service request. If the node is capable of processing the request then the request joins a queue, with each node evaluating the items that arrive in its input queue on a 'first in, first out' principle. If the service request at the front of the queue matches an available policy the service request is processed, the node is 'rewarded' (i.e. revenue is generated for the network or service operator) and the request is then deleted from the queue. If the service request does not match any of the node's enabled policies then the request is forwarded to an adjacent node and no reward is given. The more time a node spends processing service requests, the busier it is and the rewards (or revenue) generated by the node increases. Conversely, if a node does not receive many service requests for which it has an enabled policy then the node is not busy and little reward (or revenue) is being generated by that node. If a node which is receiving service requests, for which it has an enabled policy, at a greater rate than it is capable of processing those requests then the length of the queue of service requests will grow. This will lead to an increase in the time taken to process a service request and hence a poor service will be supplied to the user communities.

In order to reduce these unwanted effects it would be desirable for the nodes which are not busy and/or which have small queue lengths to able to acquire the traits of the nodes which are busy and/or have large queue lengths. One method by which this may be achieved is by adopting a scheme that is an analogue of plasmid migration in bacteria. Plasmid migration involves genes from healthy individuals being shed or replicated into the environment and subsequently being absorbed into the genetic material of less healthy individuals. If plasmid migration does not help weak strains increase their fitness they eventually die. Thus, if a node has a queue length or an activity indicator that reaches an upper threshold value then one of the node's policies is randomly copied into a 'policy pool' which is accessible to all nodes. Alternatively, the node may copy the most successful policy (in terms of generating revenue over a given recent period) or any other policy into the 'policy pool'. If a node has an activity indicator and/or a queue length that reaches a lower threshold then a policy is randomly selected from the policy pool and acquired by the node. If the policy pool is empty then the node must wait for a 'successful' node to add a policy to the policy pool. The threshold values (both upper and lower) need not be the same for the queue length as for the activity indicator.

If a node maintains the upper threshold value for the queue length or for the activity indicator for a given period of time (i.e. the node sustains its success) then the node can clone itself by producing another node having the same set of policies as the parent node. This is analogous to healthy bacterium with a plentiful food supply reproducing by binary fission to produce identical offspring. Alternatively, this cloning process may be initiated by the node's queue length or activity indicator reaching a second upper threshold value, this second upper threshold value being greater than the first upper threshold value. Conversely, if a node maintains the lower threshold value for the queue length or for the activity indicator for a given period of time (i.e. the idleness of the node is sustained) then some or all of the enabled policies of the node are deleted and any dormant policies are activated. If the node has no dormant polices then once all the enabled policies have been deleted then the node is switched off. This is analogous to bacterial death due to nutrient deprivation.

Following the analogy with bacterial evolution, it is believed that a slower rate of adaptation to the environmental changes is preferable to a faster rate of adaptation, as a faster rate may mean that the network nodes end up in an evolutionary 'blind alley', without the genetic diversity to cope with subsequent environmental changes. This can be achieved by favouring random changes in nodal policies rather than favouring the adoption of successful policies or the rejection of unsuccessful policies.

The other method by which the nodal policies may be varied is analogous to random genetic mutations which occur in bacterium. For example, policy mutation may involve the random alteration of a single value in a policy. If a policy were to have the form:

Accept request for service a if activity indicator<80% then permissible mutations could include (mutation indicated in bold);

Accept request for service c if activity indicator <80%, or
Accept request for service a if activity indicator <60%, or
Accept request for service a if queue length <80%.

Simulations have shown that single value mutations give rise to stable systems with fairly low rates of mutation. Whilst it would be possible to have multiple value mutations (e.g. 'Accept request for service a if activity indicator<80%' mutating to 'Accept request for service b if queue length<20%') this may lead to an unstable system. Results of simulations show that because of the long-term self-stabilising, adaptive nature of bacterial communities, which is mimicked by the nodal policies, a network management algorithm based upon bacterial genetic structure and environmental responses provides a suitable approach to creating a stable network of autonomous nodes. The above approach makes each node within the network responsible for its own behaviour, such that the network is modelled as a community of cellular automata. Each member of this community is selfishly optimising its own local state, but this 'selfishness' has been proven as a stable community model for collections of living organisms (R Dawkins, "*The Selfish Gene*", Oxford University Press, 1976) and partitioning a system into selfishly adapting sub-systems has been shown to be a viable approach for the solving of complex and non-linear problems (S Kauffman et al "*Divide and Coordinate: Coevolutionary Problem Solving*", ftp://ftp.santa-fe.edu/pub/wgm/patch.ps). Thus overall network stability is provided by a set of cells that are acting for their own good and not the overall good of the network and this node self-management removes most of the high-level network management problems.

The inventors have implemented a simulation of a network according to the present invention (and of the kind described above). The simulation system supports up to ten different service types but in the interest of simplicity the following discussion will refer to a subset of four of these service types; A, B, C, D and is based upon a rectangular grid having 400 vertices (which is merely an exemplary value and not critical to the working of the invention). The system is initialised by populating a random selection of vertices with enabled nodes. These initial nodes have a random selection of policies which define how each node will handle requests for service. These policies have a number of variables and are represented by the form $\{x,y,z\}$ where:

x is a function representing the type of service requested;

y is a function between 0 and 200 which is interpreted as the value in a statement of the form Accept request for service [Val(x)] if queue length <Val(y); and z is an integer between 0 and 100 that is interpreted as the value in a statement of the form Accept request for service [Val(x)] if busyness <Val(z %)

A node having a number of policies is represented as $\{x_1,y_1,z_1: x_2,y_2,z_2: \ldots : x_i, y_i,z_i\}$ Requests are input to the system by injecting sequences of characters, which represent service requests, at each vertex in the array. If the vertex is populated by a node, the items join a node input queue. If there is no node at the vertex then the requests are forwarded to a neighbouring vertex. Each node evaluates the service requests that arrive in its input queue on a 'first in, first out' principle. If the request at the front of a nodal queue matches an available rule then the request is processed, the node is rewarded for performing the request and the request is deleted from the input queue. If there is no match between the service request and the node's policies then the request is forwarded to another vertex and no reward is obtained by the node. Each node may only process four requests per measurement period (henceforth referred to as an epoch). The more time a node spends processing requests, the busier it is seen to be and the greater the value of its activity indicator. The activity indicator can be determined by calculating the activity in the current epoch, for example, if the node processed three requests in the current epoch, generating 25 'points' of reward for each processed request, then the activity indicator would be 75. However in order to dampen any sudden changes in behaviour due to a highly dynamic environment it is preferred to combine the activity indicator at the previous epoch with the activity indicator for the current epoch. It has been found for the simulated network that a suitable ratio for the previous indicator to the current indicator is 0.8:0.2. For example, if in this epoch the node has processed three requests with each generating 25 points, and the node had an activity indicator of 65 for the previous epoch then the activity indicator for the present epoch will be 67. It will be seen that the ratio between the two indicators will vary with each system and depend upon how dynamic the system is. It should be also noted that the selection of four processing steps per epoch is an arbitrary choice and that other values may be adopted for this parameter. Plasmid interchange, as described above, was modelled in the simulation and if, through the interchange of policies, a node has more than four enabled policies then the newest policy to be acquired is repressed (i.e. registered as now being dormant) so that no more than four policies are enabled at any time in a node (although this limit of four enabled policies is an arbitrary one and may be varied). If a node has 4 enabled polices and acquires one from the policy pool then the policy acquired from the pool will not be repressed, but one of the policies previously present will be repressed. Other selection criteria may be applied when repressing policies, e.g. repressing the least successful policy or the policy which has been enabled for longest, etc.

Currently, values for queue length and the time-averaged activity indicator are used as the basis for interchange actions, and evaluation is performed every five epochs. If the queue length or activity indicator is above a threshold then one of the node's policies is copied into a 'policy pool' accessible to all nodes. Both of the threshold values were 50 in this example and it is clear that this value is only an example, other threshold values may be selected and there is no need to have the threshold value for the queue length to be equal to that of the activity indicator. The threshold values will determine the number of nodes which can reproduce to occupy the system and should be chosen suitably to match the performance requirements of the system. If the node continues to exceed the threshold for four evaluation periods (i.e. 20 epochs), it replicates its entire genome into an adjacent vertex where a node is not present, simulating reproduction by binary fission which is performed by healthy bacteria with a plentiful food supply. Offspring produced in this way are exact clones of their parent.

If the activity indicator is below a different threshold, for example 10, then the node is classified as idle and a policy is randomly selected from the policy pool and inserted into the node. If a node is 'idle' for three evaluation periods (i.e. 15 epochs), its enabled policies are deleted. If any dormant policies exist these are enabled, but if there are no dormant policies then the node is switched off. This is analogous to bacterial death by nutrient deprivation. For example, if a node having the policy {a,40,50:c,10,5} has an activity indicator of greater than 50 when it is evaluated, it will put a random policy (e.g. {c,10,5}) into the policy pool. If a node with the genome {b2,30:d,30,25} is later deemed to be idle it may import that policy and become {b,2,30:d,30,25: c,10,5}. If the imported policy does not increase the activity indicator of the node such that the node is no longer idle then a further policy may be imported; if there is no further policy to be imported then the node may be deleted.

Figures 2B, 2C:
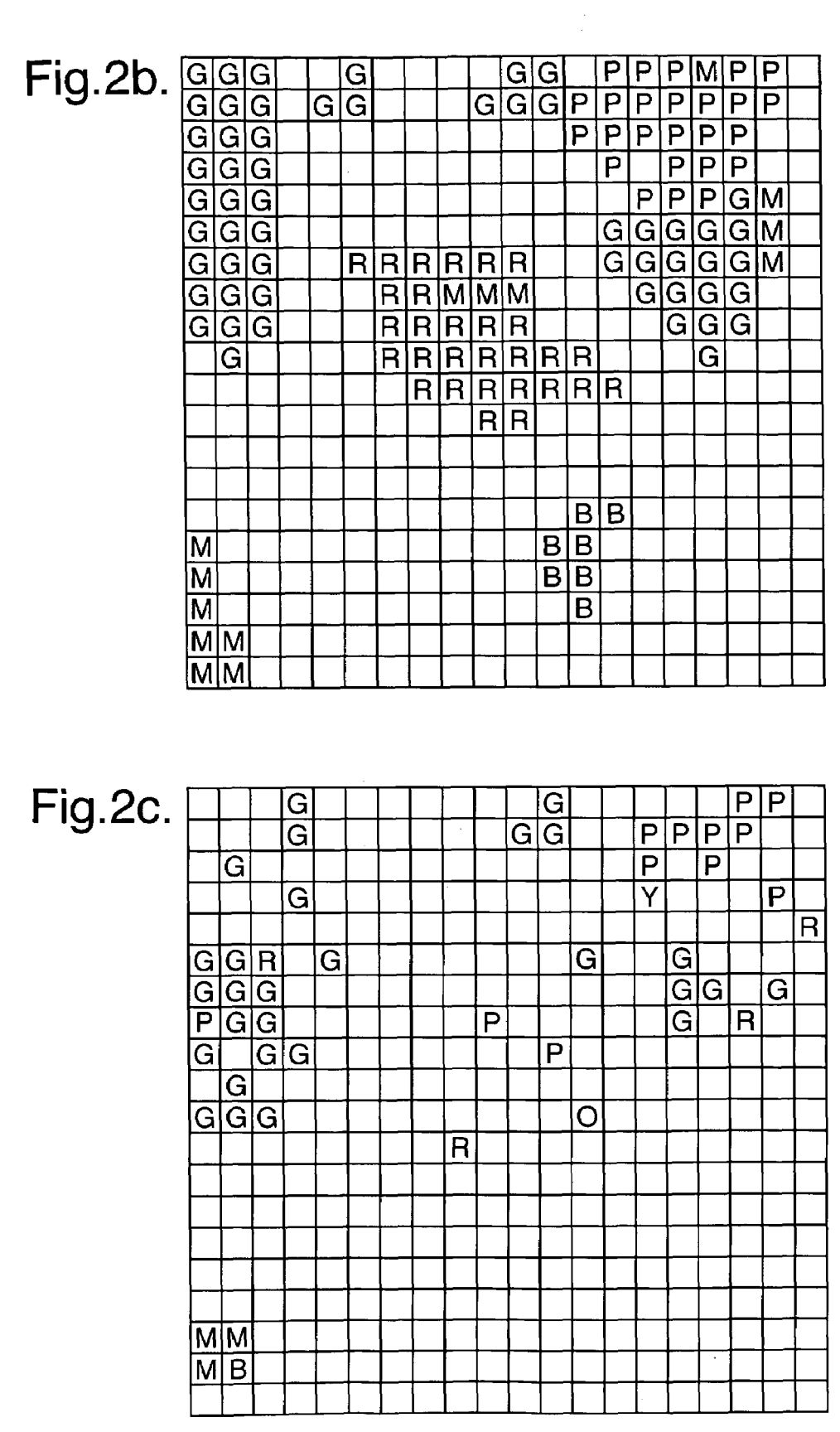

A visualisation environment was created for this implemented simulation. The visualisation environment provides an interface where network load and other parameters can be varied in many ways, thereby allowing stresses to be introduced into the system in a flexible manner. For instance, the ratio of requests for the four services can be made to vary over time, as can the overall number of requests per unit time. A 'petri dish' that can accommodate up to 400 nodes was used to display the system state. Rules governing reproduction and evolution, including plasmid migration (as described above), were introduced into the simulation, in an attempt to force the nodes to model the behaviour of bacterium in a changing environment. FIG. 2 shows what happens when an initial low load is increased and then reduced. Each strain of node that can process a single type of request is represented in the FIG. 2a by a code representing the colour used to display the strain by the simulator, e.g. R [red], G [grey], B [blue], etc. When the load increases (FIG. 2b), the existing colonies increase in size and colonies of new strains of node appear due to mutation and plasmid migration. More complex strains with the ability to handle more than one service request type were depicted by a combination of these colours e.g. a node which could process the strains indicated by red and blue is indicated by P [purple] (see FIGS. 2a & 2b). FIG. 2c shows the response to a decrease in load. As in real bacterial communities a decrease in food causes a large amount of cell death, but also an increase in diversity (which is shown by the increase in the number of different node strains) as more plasmid migration and mutation occurs.

It will be immediately obvious that the control parameters given above are merely exemplary and are provided to illustrate the present invention. The optimal values of the different parameters will vary from system to system depending upon their size, dynamic constants, growth rates, etc.

FIG. 3 shows an alternative simulation of a network according to the present invention, in which the nodes are arranged and inter-connected in a different configuration. Instead of the square grid of 20×20 vertices, the nodes are arranged in a rectangular array of 50×10 vertices. Instead of requests for services arriving randomly within the array, all requests for services arrive at the nodes along one of the longer edges of the array, with requests arriving with equal probability at the 50 nodes in the uppermost row of the array.

It will be understood that the orientation of the rectangular array and the arrival of the requests at the uppermost layer of the array are arbitrary. The service requests could arrive at the lowest layer of the array and travel upwards through the array, or the array could be rotated through 90° with the requests arriving at either of the longer edges. Equally, the requests could arrive at one the shorter edges of the array.

The size and proportion of the array are merely exemplary and are not critical to the working of this embodiment of the invention.

Figure 4A:
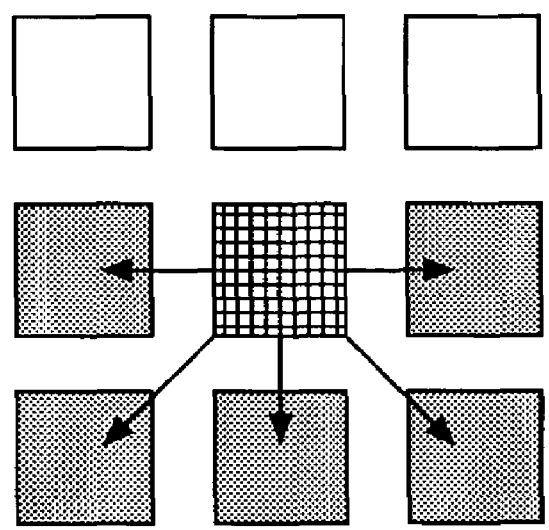
FIG. 4 shows the possible movement options of an unprocessed service request.
Figure 4B:
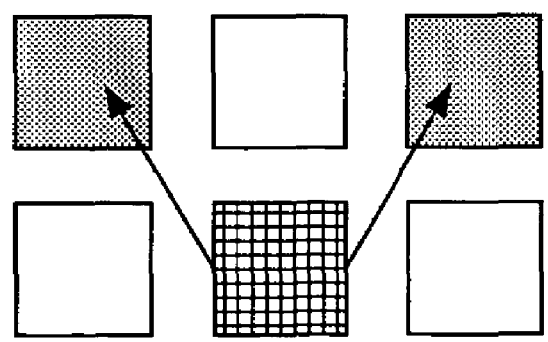

Additionally, the network is no longer fully connected such that when a node needs to forward a service request to another node it only has a subset of local nodes to forward the request to. For the uppermost 9 layers of the array this subset consists of the nodes directly left, right and below the forwarding node and the two nodes that are directly diagonally below the forwarding node (see FIG. 4a). When a request that reaches the bottom layer needs to be forwarded it can only be forwarded to one of the two nodes that are directly diagonally above the forwarding node (see FIG. 4b). If a functioning node is not available (i.e. only empty vertices exist at the possible forwarding points) the request is forwarded randomly to one of the empty vertices then forwarded again until it reaches a functioning node.

This second network simulation was executed in a similar manner to the first simulation described above. Where the difference in network connectivity caused a different approach to be taken, this will be described below. As the various service requests arrive at the uppermost layer of the array, if they arrive at a node which possesses a suitable policy for processing the request then the request is processed and the activity indicator of the node benefits accordingly. If the service request can not be processed by the node then the service request will be forwarded, either along the top row of the array or down to the second layer of the array. As there is a greater possibility of being forwarded down to the next row than along the present row, it will be seen that the general tendency of service requests will be to migrate down through the array before they arrive at a node that is capable of processing the service request. The two main implications of this process are that service requests with short TTL values have a requirement that nodes capable of processing those service request types are more prevalent in the upper layers of the array so that the service request can be processed before they time out; and there is a selective advantage for the nodes in the uppermost layers of the array as they are closest to the supply of resource which, unless there is some form of compensating mechanism, will lead to those nodes having policies for as many different types of service request as possible. This will lead to the stockpiling of as many service requests as possible in their input queues in an attempt to maintain their activity indicator at a high level and provide a buffer in the event of a prolonged period of time in which there is a low request rate.

Occupying a position in the uppermost layers of the array will provide an advantage to all nodes, but some nodes will be more advantaged than others by this. It is obvious that nodes that process predominantly short TTL requests will be better positioned at or near to the supply of service requests to the network, but nodes processing predominantly long TTL requests may also benefit by being near the point of request origin. A request having a long TTL may be processed equally well after passing through several layers of the network as if it had been processed at the edge of the network, but although a node may be thriving on the ninth layer of the array if it produces clones that populate the eight layer of the array then the clones will start taking some of the parent's potential requests, thereby decreasing the viability of the parent node. To try and encourage discerning use of all areas of the network, several penalties were introduced for nodes that effected their performance depending on their position.

In much the same way as different shop locations command different rentals based on proximity to customers, different nodes can be 'charged' more for occupying vertices that are nearer to the source of requests. In the 10 layer network described above each node in the first layer was penalised 9 fitness points per epoch, each node in the second layer 8 fitness points per epoch and so on, with no penalty being levied on those nodes which populate the lowest layer of the array.

One of the nodal characteristics that is used to determine the preferential survival and reproduction of a node is the maximum length of its queue. Due to the essentially selfish nature of the nodes there is selective pressure to evolve as big a 'maximum queue size' as possible, thereby keeping a large reservoir of requests for periods of low request rate. To counteract this obvious benefit of long maximum queue lengths a penalty was introduced to a node for allowing a request to 'die' in its queue. If a node accepts a request onto its queue that has exceeded its TTL by the time the node attempts to process it, the node receives a penalty, for example a reduction of the activity indicator by 4 points.

A more indirect penalty was created by penalising nodes that passed on requests with short times to live after realising they do not contain a policy to process the request. It is very anti-social to forward a near 'dead' request to the bottom of a neighbouring node's pile of requests (given the aforementioned timeout penalty) so nodes are penalised for forwarding a request based on the remaining TTL of that request. This should put evolutionary pressure on nodes to restrict the maximum length of their queues, as there is no penalty for not accepting a request. This penalty function has an effect on the optimal position of a node. If a node processes predominantly requests having a long TTL, occupying a prominent position in the network would mean it would have to forward all requests having a short TTL and incurring penalties for this. It is advantageous for these nodes to reside where the short TTL requests have already been processed, i.e. in the lower layers of the array. Although these penalties have been implemented by directly reducing the activity indictor of the node, it is also possible to penalise nodes by reducing the time window that they have to process requests The simulation of a partially connected network includes an additional mechanism that is an analogy of tropism, which is the response of plants and lower order animal forms to a stimulus that has a greater intensity from one direction than another. For example, most plant seeds exhibit phototropism (a response to light) by sending shoots to maximise the effects of photosynthesis and hydrotropism (a response to water) by sending root systems to maximise water uptake from their environment. Each node has a tropism value encoded within its genome, which can be within the range 0 to 1, and which can effect the manner in which the node reproduces by binary fission (note that the tropism value is not transferred during plasmid migration). The tropism value of a node may be altered by a random mutation. If a node has a tropism value of greater than 0.5, its offspring will spawn directly to the left (at a 25% probability), directly to the right (at a 25% probability) or directly above the parent node (at a 50% probability). Alternatively, if the node's tropism value is 0.5 or less then its offspring will spawn directly to the left (at a 25% probability), directly to the right (at a 25% probability) or directly below the parent node (at a 50% probability). This allows some strains of nodes to evolve a preference for living in the upper levels of the array and other strains to prefer a life in the lower levels of the array. Those nodes that have a low tropism value are likely to process predominantly long TTL service requests due to their preference for the lower levels of the array, whilst those nodes having a high tropism value are likely to possess policies enabling them to process predominantly short TTL service requests due to their preference for the upper levels of the array.

As described above for the simulation of the fully connected network, nodes which have persistently low activity indicators first of all have one or more nodal policies repressed, until eventually the node 'dies', i.e. all of its policies have been repressed. For the simulation of the partially connected network an exception to this process was provided, wherein a node that is about to 'die' may sometimes change position with the node directly above or directly below them, allowing a node to move in a preferred direction where it may find more suitable conditions even if it's path is blocked by another node. The direction of the move is dependent upon the tropism value of the underperforming node with low tropism value nodes moving down the array whilst high tropism value nodes will move up the array. Simulation has shown that a suitable probability for allowing such a positional switch to occur is 10%.

Figure 5A:
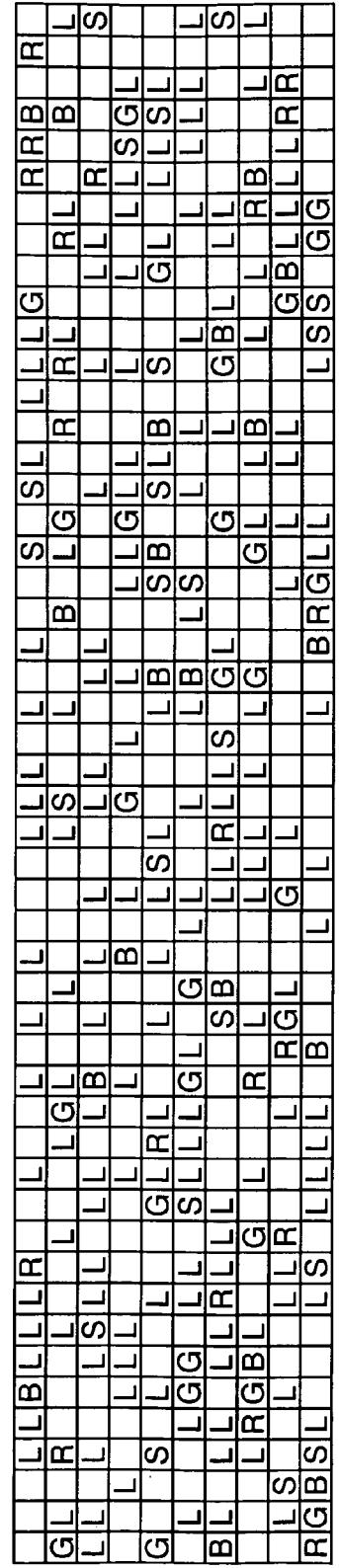
FIG. 5 shows a schematic depiction of the response of a multi-service communications network according to the present invention over a period of time to different levels of network traffic.
Figure 5B:
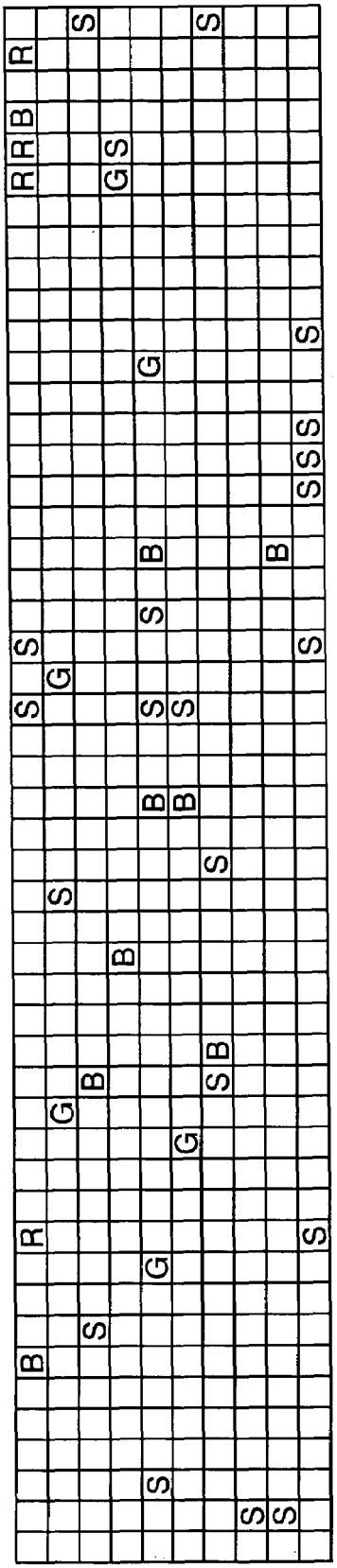
Figure 5C:
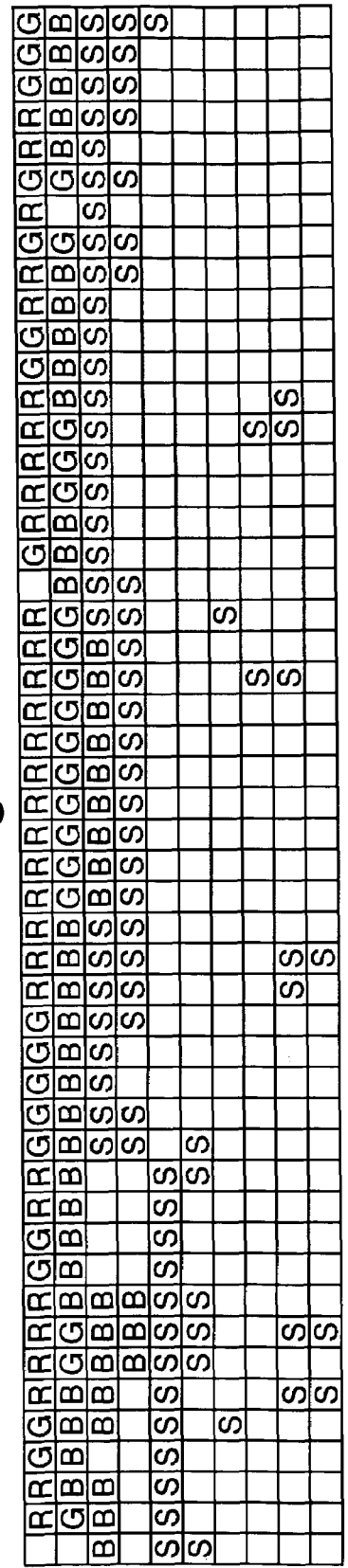

FIG. 5 shows a simulation exercise which was performed using the model described above for a partially-connected network having an array size of 50×10. FIG. 5*a* shows that initially there are a large number of nodes present in the simulated network, with the five different strains of node being distinguished by a different letter (R, G, B, S & L). The different types of node are distributed in a seemingly random manner across the array. FIG. 5*b* shows the simulation after a period of time in which service requests have been arriving randomly at positions along the uppermost layer of the network and have been processed as described above. As with the simulation of the fully-connected network described earlier in connection with FIG. 2, the most active nodes are able to produce clones of themselves and/or pass on copies of successful policies to less active nodes, which will eventually be deleted unless they increase their activity levels sufficiently. At the point in time shown in FIG. 5*b*, the number of enabled nodes has decreased significantly but the different strains are still randomly distributed amongst the array. It should be noted the strain of nodes denoted by L has now become extinct. FIG. 5*c* shows the result of the simulation after it has been running for a considerable period of time and has now reached a steady state. FIG. 5*c* shows that the nodes denoted by R, which process the service requests having the lowest TTL, are found only in the uppermost layer of the array, whilst the nodes denoted by S, which process the service requests having the highest TTL, are found mainly in the third and fourth layers of the array, with a small population sparsely scattered around the bottom five layers of the array. The nodes, which are denoted by G and B are concentrated within the first & second layers and the second & third layers respectively of the array. These nodes process service requests having intermediate TTL values, with the TTL value of the requests processed by G nodes being lower than that of the requests processed by B nodes. FIG. 5*c* shows that the simulated network does process short TTL service requests close to the periphery of the network, with long TTL service requests being processed further down within the network.

Figure 6A:
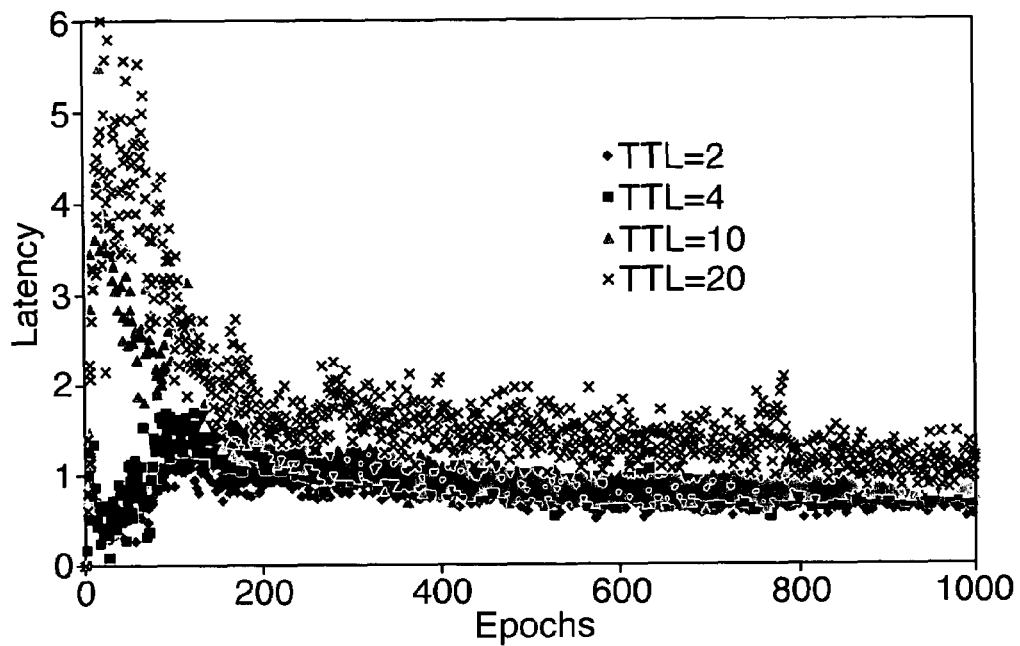
FIG. 6 shows a graphical depiction of the latency variation within a multi-service communications network according to the present invention.
Figure 6B:
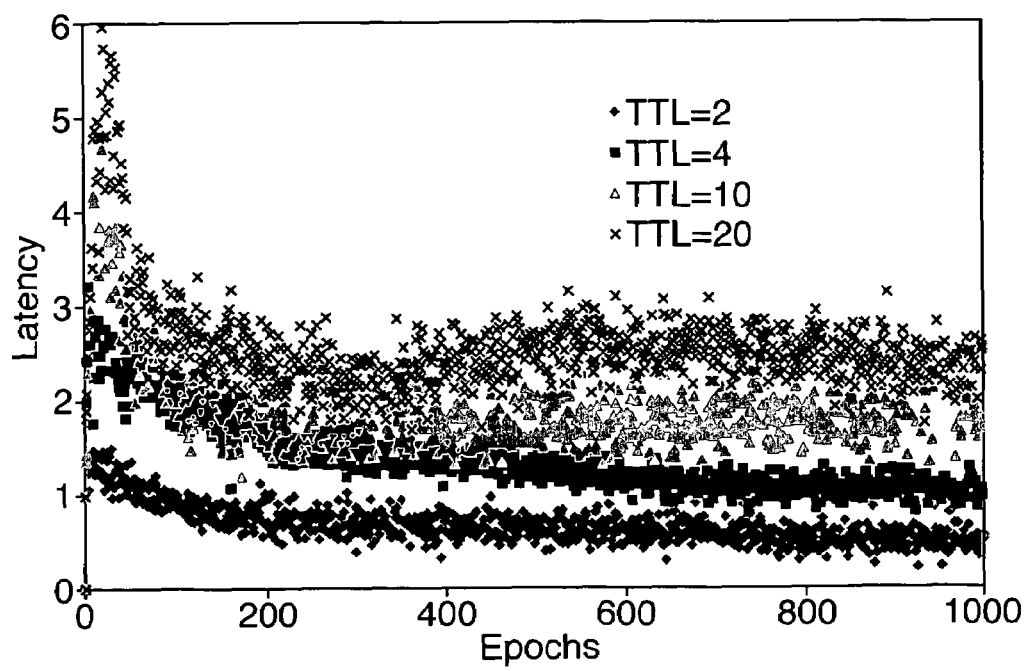
Figure 7A:
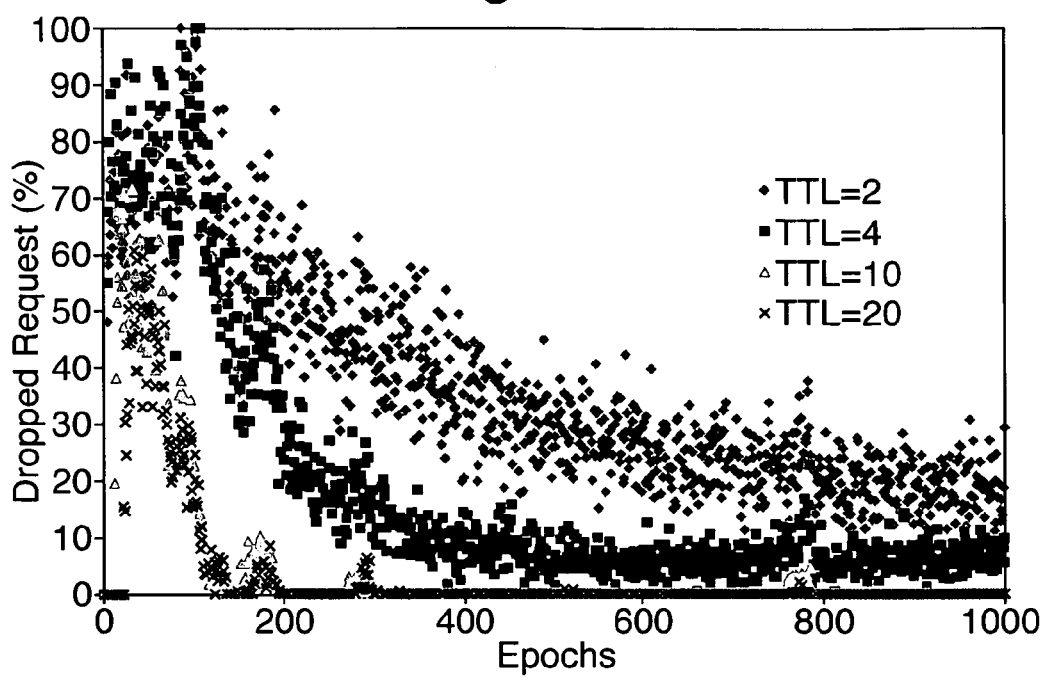
FIG. 7 shows a graphical depiction of the percentage of dropped service requests within a multi-service communications network according to the present invention.
Figure 7B:
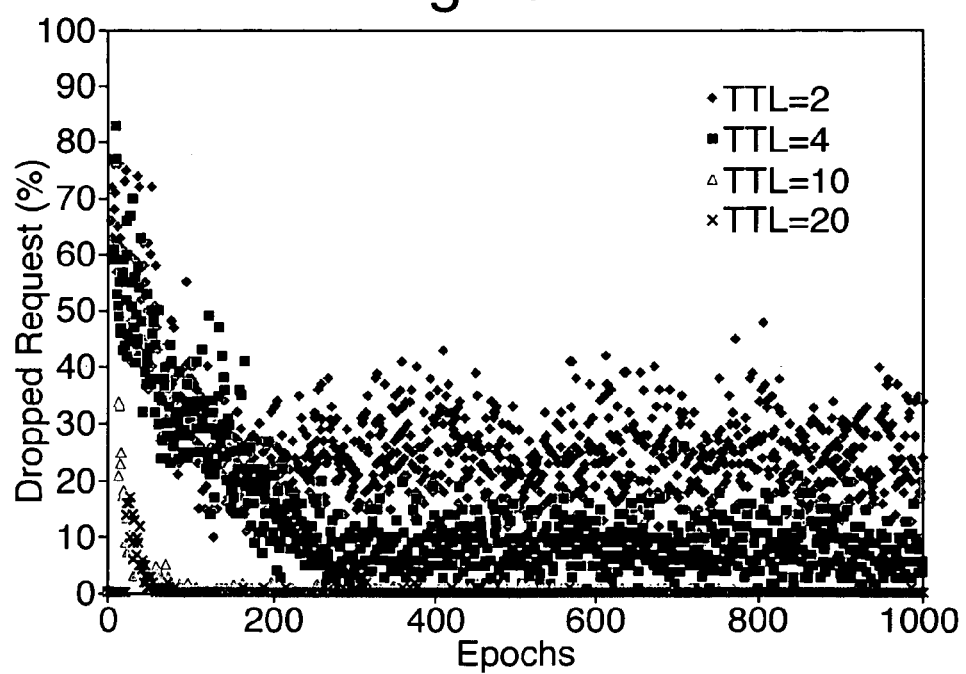

FIGS. 6 and 7 show two comparisons between the fully connected network simulation and a partially connected network simulation. FIG. 6 shows the latency of processed service requests for four different types of service requests, each having a different TTL value, for the two different simulations (FIG. 6a shows the result for the fully connected network and FIG. 6b shows the result for the partially connected network). FIG. 6 shows that in each simulation similar results are obtained, with the requests having the shortest TTL have the lowest latencies, although the fully-connected network gives a smaller range of latency values. FIG. 7 shows the percentage of dropped service requests for four different types of service requests, each having the same TTL value as in FIG. 6, for the two different simulations (FIG. 7a shows the result for the fully connected network and FIG. 7b shows the result for the partially connected network). FIG. 7 shows again that similar results are obtained for both of the simulations, with the service requests having the smallest TTL values being those which are the most likely to be dropped whilst waiting to be processed by a node.

The partially connected network, in which service requests arrive at random along the edge of the network is more representative of a real life network than the fully-connected network in which service requests are inserted randomly within the network. However, for real network users are not all situated along a single edge of the network but are distributed across a large area, so that they in effect send service requests to a number of network edges. It will be understood that the concepts described above for the partially-connected network could be adapted in a number of ways to provide an 'entire' network rather than just the edge to a network.

The topology of the network is described as being "substantially polygonal". Whilst previous discussions have focussed on square and rectangular networks, it will be readily understood that the concept can be extended to cover other regular polygons (e.g. pentagons, hexagons, octagons, etc.) and irregular polygons. It is also possible that service requests could be introduced along more than one network edge. In these cases, a more sophisticated approach may need to be adopted to describe the distance of the nodal location from the network edge from which the requests are inserted. Additionally, although previous discussions have focussed on networks having straight edges, the edges of the network may have concave, convex or complex geometries.

An example of such a multi-service network is as described by M Fry & A Ghosh, "*Application Level Active Networking*", available from http://dmir.socs.uts.edu.au/projects/alan/papers/cnis.ps. The network would contain a number of large scale active network nodes (ANNs), with each ANN comprising a large processor cluster, for example up to 200 processors, with each processor running a dynamic proxylet server (DPS) and around 10 Java virtual machines (JVMs), each of which contain one or more proxylets (a proxylet is a small program that implements an active network service, such as transcoding a data resource from one format to another e.g. from a QuickTime video stream to a RealPlayer video stream, or from CD format audio to MP3 format audio).

Each DPS controls and implements the algorithmic rules discussed above that determine the activity indicator levels at which nodes may reproduce, export nodal policies, import nodal policies, etc. The JVMs are the nodes (i.e. analogous to bacterium) with the proxylets (or policies pointing to the proxylets and authorising execution) providing the nodal policies (i.e. the genes of the bacteria).

In use, the proxylets are mostly multi-user devices, but they may be installed and used by a single user. A proxylet may be installed by a user who then proceeds to load the proxylet by making suitable service demands (this is analogous to placing a nodal policy into a node and then injecting some requests for the service it represents). Only at very low traffic loads will a given proxylet not be present at all the ANNs, but this gives rise to efficient network resource utilisation as proxylets are run only in response to user demand and are run at a convenient network location.

The nodes of the simulated network do not have any awareness of the concept of an ANN or the boundaries between the different ANNs that comprise a network. The main reasons for this is to minimise the complexity of the nodal operations and because of the fuzzy nature of the boundaries in a cluster model.

The simulation indicates that such an active network should be capable of implementation and that reasonable levels of performance achieved. The ability to manage the deployment of new services over such networks has also been successfully simulated.

What is claimed is:

1. A method of operating a multi-service communications network comprising a polygonal topology and including a plurality of nodes located along at least one edge of the network and a plurality of nodes located away from the edge of the network, each node being directly connected to one or more neighboring nodes such that each node is directly or indirectly connected to every other node in the network, the method comprising, at each node:

either (a) selectively performing one or more services upon receipt of a service request in accordance with one or more nodal policies, when implemented by the node, or (b) forwarding a service request to a neighboring node, each nodal policy including: (i) a service request type identifier indicating the type of service request to which the policy applies, and (ii) one or more service request criteria which specify the circumstances under which a node implementing the policy will perform a requested service;

wherein, whenever a node receives a service request at option (a), either from a user of the network or from a neighboring node, if the node is operating in accordance with a nodal policy whose service request type identifier corresponds to the type of the received service request and the criteria set out in the nodal policy are satisfied, then the service request is processed by the node or queued by the node for subsequent processing, but otherwise at option (b) the request is forwarded to a neighboring node, unless, in either case, the request has timed out;

maintaining an activity indicator whose value is determined in dependence upon the amount of time the node spends performing services in response to service requests; and selectively varying a nodal policy or its implementation with a probability which is inversely correlated to the value of the activity indicator, wherein service requests from users of the network are initially inserted into node locations along at least one edge of the multi-service communications network, and wherein each node, when forwarding a service request to a neighboring node, selects a neighboring node to which to forward the request to cause a tendency for forwarded service requests to migrate away from said plurality of nodes located along said at least one edge of the network.

2. A method according to claim 1 wherein the service request criteria of one or more nodal policies includes a time to live for a received service request.

3. A method according to claim 1 wherein, if the activity indicator reaches a first upper threshold level, then the node exports one or more of its nodal policies.

4. A method according to claim 3 wherein, if the activity indicator reaches a second upper threshold, then the node replicates all of its nodal policies to generate a clone of the node.

5. A method according to claim 1 wherein, if the activity indicator reaches a first lower threshold, then the node imports a further nodal policy.

6. A method according to claim 5 wherein, if the activity indicator reaches a second lower threshold, then the node deletes an enabled nodal policy and enables a dormant nodal policy.

7. A method according to claim 6 wherein, if the activity indicator reaches a third lower threshold, then a variable within a nodal policy is randomly varied.

8. A data storage medium containing computer code which, when executed by a computer at each of plural nodes in a multi-services communications network causes the network to carry out the method of claim 1.

9. A multi-service communications network comprising a polygonal topology and including a plurality of nodes located along at least one edge of the network and a plurality of nodes located away from the edge of the network, each node being directly connected to one or more neighboring nodes such that each node is directly or indirectly connected to every other node in the network, wherein each node comprises a processor, said processor having:

means for either (a) selectively performing one or more services upon receipt of a service request in accordance with one or more nodal policies, when implemented by the node, or (b) forwarding a service request to a neighboring node, each nodal policy including: (i) a service request type identifier indicating the type of service request to which the policy applies, and (ii) one or more service request criteria which specify the circumstances under which a node implementing the policy will perform a requested service;

wherein whenever a node receives a service request at option (a), either from a user of the network or from a neighboring node, if the node is operating in accordance with a nodal policy whose service request type identifier corresponds to the type of the received service request and the criteria set out in the nodal policy are satisfied, then the service request is processed by the node or queued by the node for subsequent processing, but otherwise at option (b) the request is forwarded to a neighboring node, unless, in either case, the request has timed out;

means for maintaining an activity indicator whose value is determined in dependence upon the amount of time the node spends performing services in response to service requests; and means for selectively varying a nodal policy or its implementation with a probability which is inversely correlated to the value of the activity indicator, wherein the network is arranged such that service requests from users of the network are initially inserted into node locations along at least one edge of the multi-service communications network, and wherein each node is operable, when forwarding a service request to a neighboring node, to select a neighboring node to which to forward the request to cause a tendency for forwarded service requests to migrate away from said plurality of nodes located along said at least one edge of the network.

* * * * *